INVENTOR.
HERBERT S. LENHART

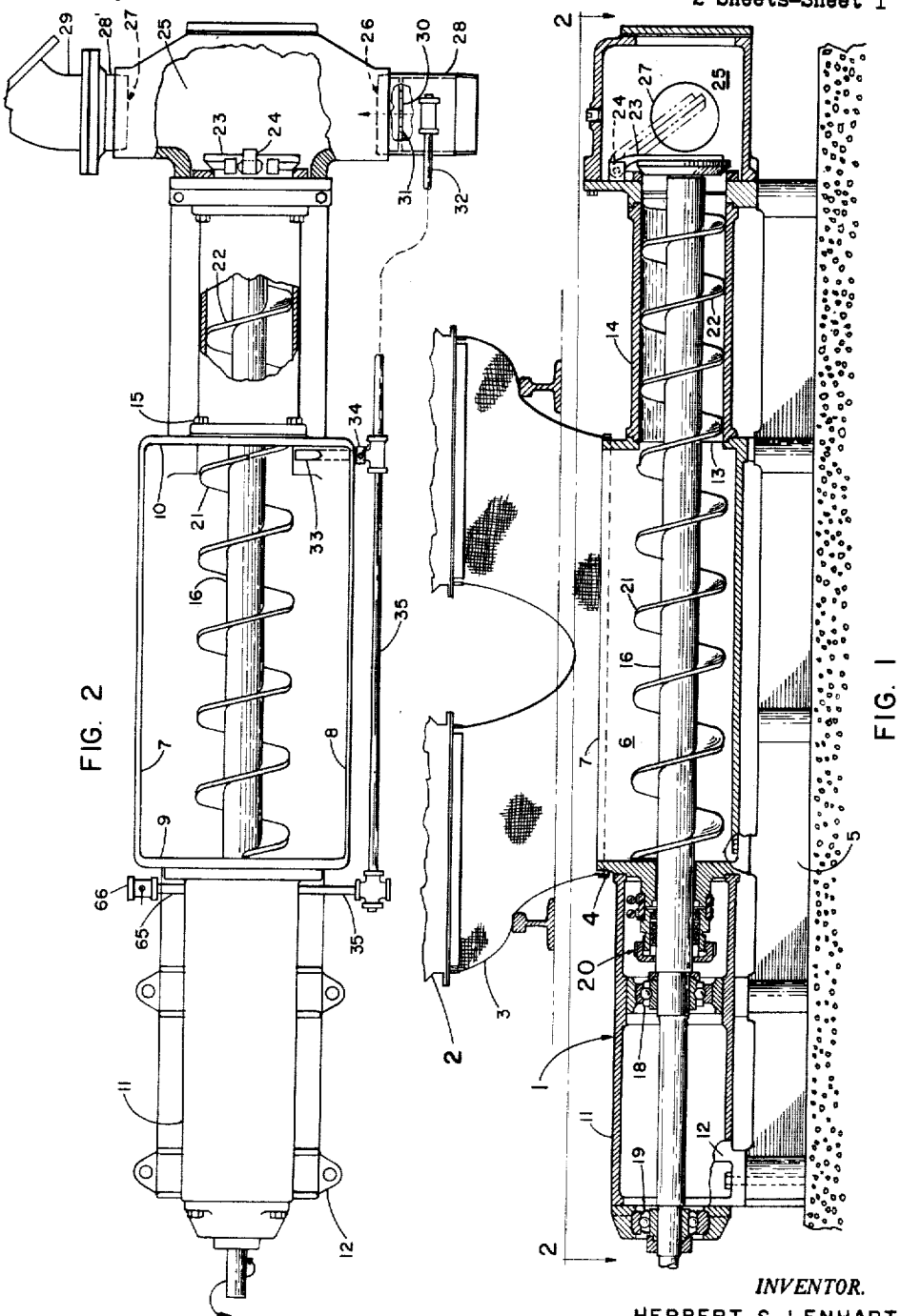

United States Patent Office 3,106,428
Patented Oct. 8, 1963

3,106,428
PNEUMATIC CONVEYING APPARATUS
Herbert S. Lenhart, Allentown, Pa., assignor to
Fuller Company, a corporation of Delaware
Filed May 29, 1961, Ser. No. 113,377
4 Claims. (Cl. 302—50)

The present invention relates to the pneumatic conveying of pulverulent or granular materials, and is concerned more particularly with the transfer of such materials between storage points and between storage points and points of use.

The increasing acceptance of pneumatic conveyors as means for transferring bulk materials has led to greater demands for versatility, and particularly efficiency, on the part of such equipment.

Railway car unloading and the transfer of material to plant bins or to other vehicles have been accomplished with both vacuum-type and pressure-type pneumatic conveying systems. The possibility of original filling of elevated storage bins by pneumatic means has reduced the basic need or value of mechanical elevators in services such as ready-mix concrete plants, making fully pneumatic plants even more desirable economically. The conveyor of the present invention is also ideally suited for in-plant service to supersede such elevators.

In the unloading of railway cars, it has been necessary to provide waterproofed, deep boxes or pits of concrete to provide sufficient protection and vertical clearance for these large pneumatic conveyors. The present invention avoids the need for such masonry pits, and is adaptable to shallow cuts without concern for precise levelling or alignment of the unit.

Prior pneumatic transfer systems have included heavy-duty, generally high-pressure units of relatively high cost and power consumption in relation to the short distances and low capacities here involved, as well as very much lighter duty units such as rotary feeder systems which are, however, very susceptible to erosion and destruction by abrasive materials such as the hydraulic cements used for concrete.

A particular problem of pneumatic conveyors of the type referred to which use relatively long, rotating screw shafts for advancing material into a gas stream has been that of alignment of such shafts through plural bearings at one end, a material-conveying tube or bore at its other end, and a shaft seal located on the shaft between the former two points to prevent the escape of material along the shaft to the bearings.

Shaft seals for this service have been developed to maintain sealing clearances even after service wear. However, with any substantial misalignment the efficiency of these relatively expensive seals is soon destroyed. Relatively simple seals such as those using compressed columns of packing material are also susceptible to damage or extreme wear from misalignment and require frequent attention to compensate for wear of the sealing or packing material, particularly under abrasive conditions. In either case, it has been considered highly desirable to design a rigid alignment into such conveyors. The more efficient way for achieving this rigidity has been the use of very heavy construction designs and material on the conveyor itself, and of relatively massive aligning and mounting bases.

The present invention provides, for shafts of such pneumatic conveyors, a seal of relatively simple design with a resilient mounting permitting considerable latitude in alignment, and thereby further permitting a much lighter construction of the entire unit.

In general, the preferred form of the present invention provides a pressure-type pneumatic conveyor casing having means to compact the incoming material and simultaneously advance it through a sealing bore to a point in the region of the discharge outlet of the casing. A mixing chamber adjacent the discharge outlet includes a gas inlet to admit air under pressure to agitate and disperse the compacted material and to entrain it through the discharge outlet.

The material is advanced through the bore by a screw conveyor with progressively decreasing pitch, in the direction of material motion, to provide a pressure-sealing compaction of at least a portion of the material in the bore. The gas inlet is aligned with the discharge outlet to direct a plurality of gas streams transversely across the path of the material forced into the mixing chamber through the bore.

A portion of the shaft remote from the material-sealing zone leads externally of the casing to be engaged by a driving mechanism and is sealed with the casing by a pressure seal resiliently coupled to the casing.

A better understanding of the invention may be derived from the accompanying description and drawings, in which:

FIG. 1 is a sectional side view of an unloader according to the invention;

FIG. 2 is a plan view, partly cut away, and taken along lines 2—2 of FIG. 1;

Figure 3:
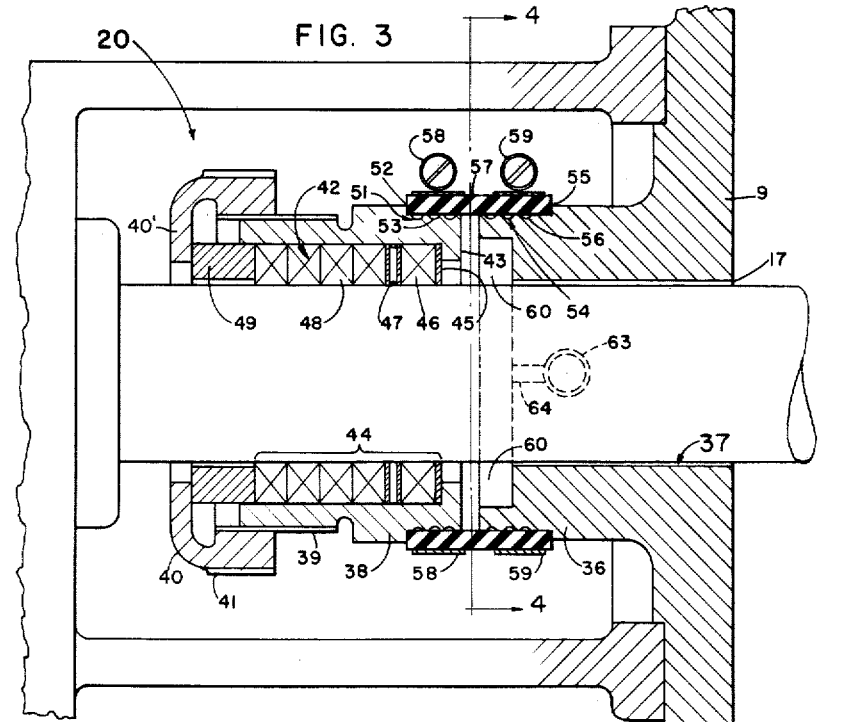
FIG. 3 is a portion of FIG. 1 showing the shaft seal on an enlarged scale.

As shown in the drawings, the invention is illustrated as an unloader 1 for a railway car 2 standing on rails and comprises a casing 4 mounted beneath the rails on a base 5 and communicating with the railway car 2 via a flexible sleeve 3. It is to be understood, however, that the utility of the present invention is not limited to this particular service.

The casing 4 comprises a hopper 6 having sidewalls 7 and 8 and end walls 9 and 10. A bearing housing 11 extends from the rear end wall 9 and is secured to the base 5 by supports 12. The front end wall 10 is provided with an opening 13 and receives a barrel 14 which is secured thereto by bolts 15 and which is in alignment with the opening 13.

The barrel 14, opening 13 and bearing housing are aligned to receive a shaft 16 extending therethrough and through a similarly aligned opening 17 in the rear end wall 9. A pair of bearings 18 and 19 in the bearing housing 11 are spaced from each other and from the rear end wall 9, and serve to support the shaft for rotation. At the opening 17 in the rear end wall 9, the shaft is engaged by a seal 20 which is described more fully hereinafter. Any suitable motor (not shown) is provided for driving the shaft 16, and preferably is mounted with or on the unloader to provide an integral unit.

The portion of the shaft 16 which extends through the hopper 6 carries a first section of screw flights 21 of any suitable, preferably uniform, pitch. Preferably contiguous with the first section of screw flights, a second screw flight section 22 continues into the barrel 14 at a slightly decreasing pitch. The shaft and second screw flight terminate just short of the discharge end of the barrel to provide a seal space for material compacted by the decreasing pitch of the second screw section.

A flap valve 23 is secured on a hinge plate 24 surrounding the discharge end of the barrel 14 and acts as a check valve against air flow therethrough to the hopper if the barrel should become only partially full of material for any reason, such as may occur, for example, during the last moments of unloading of the railway car.

The discharge end of the barrel 14 and the flap valve 23 are enclosed by a discharge chamber 25. The discharge chamber 25 includes a gas inlet 26 and a gas-material or discharge outlet 27 aligned transversely across the path of material emerging from the barrel 14. The outlet 27 is spaced horizontally from the point of material emergence at check valve 23 to prevent material from simply falling into the outlet 27 or conveying line 29 by gravity.

The inlet 26 and discharge outlet 27 are provided with pipes 28 and 28', respectively, which may be adapted for any suitable quick-coupling (not shown) to communicate with a conveying line 29. The pipes 28 and 28' may be substituted for each other to permit conveying in either direction.

The gas inlet pipe 28 receives a supply of gas or air under pressure from a source, preferably a relatively low-pressure, lobe-type blower (not shown). A blower such as the Sutorbilt California Series No. 7HB has been found suitable. The air stream is subdivided in the pipe 28 by an orifice plate 30 having a plurality of similarly sized, substantially uniformly distributed apertures 31 which produce multiple jets immediately upon entering the discharge chamber and impinging on the material at the turbulent zone where the air jets are expanded enough to interfere with each other.

A tap line pipe 32 branches off the inlet pipe 28 on the supply side of the orifice plate 30 and extends along the side of the unloader. An aeration branch pipe 33 having a valve 34 therein enters through the side wall 8 of the hopper 6 and terminates adjacent the point of entrance of the material into the barrel 14. The tap line 32 supplies gas to a pressure line 35 leading to the shaft seal 20.

The end wall 9 has a hollow extension or collar 36 extending rearwardly from the opening 17, with an inner bore of from several thousandths up to a sixteenth of an inch greater than the diameter of the shaft 16 to provide a pressurizing zone 37 therebetween.

Spaced along the shaft from the collar 36, the seal 20 comprises a metallic sleeve 38 having a threaded portion 39 receiving the complementary threaded portion of a locking cap 40 having an inturned, pressure-exerting flange 40'. The locking cap 40 carries any suitable form of flats or ridges 41 to enable its rotation by suitable means such as a spanner or pipe wrench.

The sleeve 38 has an inner bore substantially larger than the diameter of the shaft 16 to provide an annular sealing or packing zone 42 therebetween. The packing zone may, for example, have a radial dimension of, about ⅜ inch. At its end adjacent the end wall collar 36, the sleeve 38 has a flange 43 turned inwardly toward but terminating short of the shaft 16 to provide closure for the inner end of the packing zone 42. The flange 43 defines the limit of, and forms an abutment for, one end of the packing column 44 within the packing zone 42.

The packing column 44 comprises an annular metallic plate 45 bearing against the flange 43; a composition packing ring 46 of asbestos packing or another suitable material; a metallic lantern ring 47 having parallel opposite faces; a plurality of composition packing rings 48, and an annular follower 49 loosely fitted on the shaft and pressed against the outer of the packing rings 48 by the inturned flange 40' of the locking cap 40 to bias the packing material to constrict the bore therethrough, thereby sealing against the shaft. The packing column may be lubricated by an ordinary fitting (not shown) in communication with the lantern ring 47. Other forms of sealing material such as resilient rings, or O rings may be used which are either externally-biased or inherently biased against the shaft. The shaft preferably has a hard-facing or alloy surface in the region of the packing column and pressurizing zone 37.

Adjacent the collar 36, the sleeve 38 has a peripheral recessed portion 51 on its outer surface which forms a shoulder 52. A plurality of circumferential grooves 53 are formed in the floor of the recessed portion. The end wall collar 36 has a corresponding recessed portion 54, shoulder 55 and grooves 56.

Inserted between the shoulders 52 and 55 and surrounding the grooved, recessed portions 51 and 54, a section of hose 57 of rubber, resilient plastic or similar resilient material serves as a flexible coupling between the sleeve 38 and the collar 36. A pair of circumferential clamps 58 and 59 constrict the hose section against the recessed portions 51 and 54 and at least partially deform the hose into the grooves 53 and 56 to form a pressure-tight coupling. The hose section 57 maintains a clearance or spacing between the sleeve 38 and collar 36 by engagement of its opposite ends with the shoulders 52 and 55. The outer end portion of the collar 36 is recessed about the shaft 16 to form an enlarged pressure zones 60 communicating with the pace formed between the shaft and the hose and with the pressurizing zone 37.

The pressurizing zone 37 receives gas or air under pressure from the pressure line 35 via a tap hole 61 through the collar 36. From the tap hole 61, a longitudinal bore hole 62 supplies air directly to the enlarged pressure zone 60. Diametrically opposite the tap hole 61 and bore 62, similar tap and bore holes 63 and 64 permit the bleed-off of air through a pipe 65 and valve 66 to check for proper pressurization of the seal.

Figure 5:
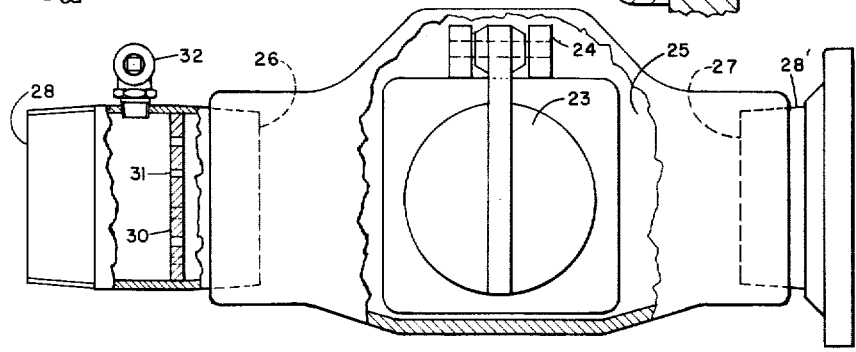
FIG. 5 is an end view, on an enlarged scale, of the unloader of FIG. 1 showing the discharge chamber.
Figure 4:
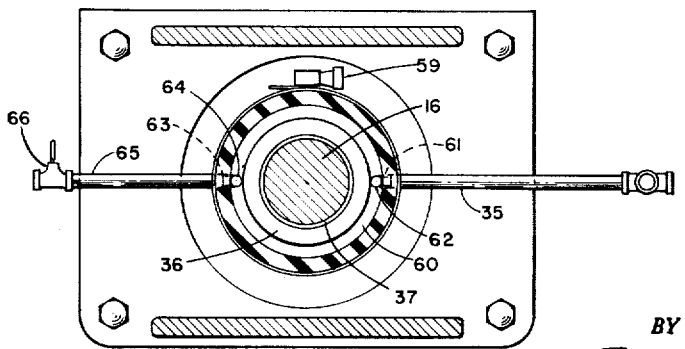
FIG. 4 is a sectional view taken on lines 4—4 of FIG. 3.

In operation of the apparatus of FIGS. 1 through 5, the shaft 16 and screw flights 21, 22 thereon are set in rotation by the motor, not shown. Material discharging from the railway car enter the hopper 6 of the pump, and is advanced by the screw flight section 21 into the barrel 14 where it is advanced and compacted by the screw flight 22 to press against an open the check valve 23.

At the same time, air is delivered to the pipe 28 and passes through the apertures 31 in orifice plate 30 as a plurality of jets, distributed uniformly across the path of flow, toward the point of material entrance at the check valve 23. These air jets begin to re-expand as soon as they leave the apertures 31, and therefore create an extremely turbulent condition across the full area of the discharge chamber 25 at the point of their impact on the material. This extreme turbulence insures thorough agitation, mixing and entrainment of the material within the discharge chamber 25 and its uniform, smooth discharge through the outlet 27, pipe 28', and conveying line 29.

Since the initial paths of the material and the air-jets respectively, are at right angles to each other as they enter the discharge chamber 25, the sudden force changing the direction of the material is effective to break up compacted lumps of the material instantaneously before the material enters the outlet 27 or conveying line 29.

Since the material is required to follow a horizontal path of travel from the point of passing the check valve 23 in order to reach the outlet 27, any oversized objects, or any wet or agglomerated material is prevented from simply falling into the conveying line. With the outlet 27 at one side of the enlarged discharge chamber 25, objects or agglomerated lumps of material are permitted to accumulate, within limits, in the discharge chamber 25.

The increased volume of the discharge chamber 25 and the random-directional turbulence caused by the uniformly distributed, re-expanding air jets permit the oversized material to temporarily settle out in the chamber without being swept by the lesser air velocity therein into the high velocity area of the outlet 27 and conveying line 29, where it otherwise might be carried by the air stream to the point of delivery, or might tend to plug the line.

Therefore, the material which is entrained through the outlet 27 is most thoroughly dispersed in the air stream and is in an ideal condition for pneumatic conveying. The drying effect of compressed air on wet lumps of material, and the additional abrasive effect of the normal, dry material entering past the check valve 23, very often will result in the erosion of dry material from the surface of such lumps, and the conveying of such reconditioned material to the point of storage. Foreign objects of course, will not be so reconditioned or so readily reintroduced to the conveying stream.

The tap line 32 draws a supply of air from pipe 28, and delivers it, by way of the valve 34 and branch 33 into the hopper 6, and via the pressure line 35 into the seal pressure zone 37. The air emerging from the branch 33 aerates the material in the hopper, and tends to stabilize the feeding of material into and through the barrel 14 by the screw flights 21, 22. The air delivered through the pressure zone 37 of the seal assembly passes along the shaft 16 through the pressurizing zone and escapes into the hopper 6 to wash away any material which tends to enter the pressurizing zone 37. The air thus escaping into the hopper from the zone 37 supplements the aerating effects of the branch line 33, as well as positively preventing the entrance of material into the shaft-sealing zone. Periodically, at any convenient time, the presence of a supply of air to the pressurizing zone 37 may be tested by opening the valve 66. Air escaping from the opened valve 66 indicates pressurization of the chamber 60 and zone 37.

The seal assembly 20 prevents the escape of pressurizing air from the chamber 60 along the shaft to the atmosphere. The hose 57 assumes the torsional loading of the friction between the shaft 16 and the packing column 44 to secure the shaft seal 20 against rotation with the shaft. The hose also permits limited eccentric motion of the shaft, relative to the hopper end wall 9, or, as the case may be, permits true, non-eccentric rotation of the shaft on an axis which is not parallel to the axis of the bore through the collar 36. Therefore, the usually highly critical alignment of bearings 19, 18 with the opening 17 through the end wall 9 is entirely avoided. Of course, such eccentric motion or misalignment of axis must be within the limit of clearance between the diameter of opening 17 and the diameter of the shaft 16. However, it is a simple matter to make the opening 17 substantially larger than the diameter of the shaft 16, although excessive difference will make it more difficult for the air flushing through the pressurizing zone 37 to prevent the entry of material therein. The relationship of a shaft 16 diameter of 2.562 inches with an opening 17 diameter of 2.596 inches, in the end wall, has been found to be satisfactory.

The horizontal design of the discharge chamber 25, and the savings in height by reason of the less massive construction permitted by the seal 20, avoid the necessity for deep, undesirably dirty and often flood-susceptible pits, where the conveyor of the invention is used for unloading railway cars. For example, as a railway car unloader, the conveyor of this invention may be installed in a cut beneath the rails only 21 inches deep, which is lesser in depth than the depth of the stone or ballast-bed of many siding areas. The saving in elevation, in this particular service, is measurable in feet instead of mere inches.

As a result of the saving in height of the present invention, the previously required, waterproof concrete pits with precisely levelled bottoms may be completely eliminated in most installations, and simple cuts under the rails may be used. If the driving motor is secured to the pump to form an integral unit, the unloading pump may actually rest on the stone ballast without concern for level positioning.

Corresponding savings in head room are similarly very important in services within plants themselves. In many cases, the same unit may be made to serve for both the unloading of vehicles and the subsequent conveying of materials within the plant by simply moving the unloader below the appropriate storage bin in the plant.

Various changes may be made in the details of the invention as described without sacrificing its advantages or departing from the scope of the appended claims.

I claim:

1. Pneumatic conveying apparatus comprising a hopper including spaced forward and rearward wall portions, a discharge chamber having a discharge outlet, a barrel connecting said hopper and said discharge chamber, said barrel being in communication with said hopper through said forward wall portion and in communication with said discharge chamber at a point adjacent and spaced from the discharge outlet, shaft bearing means located rearwardly from said rearward wall portion, a rotatable shaft supported by said shaft bearing means and extending therefrom through said hopper wall portions into said barrel, said shaft terminating adjacent said discharge chamber, means for rotating said shaft, helical means on said shaft for advancing and compacting material from said hopper through said barrel to said discharge chamber, a collar on said rearward wall portion surrounding said shaft, a shaft seal spaced from said collar and in sealing engagement with said shaft, flexible coupling means connecting said shaft seal and said collar to form a pressure tight coupling therebetween, said flexible coupling means being adapted to permit limited movement of said shaft seal, said flexible coupling means being spaced from said shaft to provide an enlarged annular space between said shaft, shaft seal, collar and coupling means, an opening in said collar in communication with said enlarged space, a source of gas under pressure, means for directing at least one stream of gas from said source against the compacted material passing from said barrel into the discharge chamber, to agitate and entrain the material through the discharge outlet, and means for admitting gas under pressure through said collar opening to said enlarged space to prevent the leakage of material from said hopper into contact with said sealing element.

2. Sealing apparatus comprising a relatively stationary wall having an opening therethrough, shaft bearing means spaced from said stationary wall, a rotatable shaft extending through said wall opening and supported by said shaft bearing means, said stationary wall including a collar surrounding said shaft and facing said bearing means, a shaft seal intermediate said stationary wall and said bearing means and in sealing engagement with said shaft, flexible coupling means connecting said shaft seal and said collar to provide a fluid tight coupling therebetween, said flexible coupling means being spaced from said shaft to provide an enlarged annular space therebetween, an opening in said collar in communication with said enclosed annular space, means for admitting gas under pressure through said collar opening into said enlarged space to prevent the entrance of material through said wall opening into said enlarged space.

3. Sealing apparatus as set forth in claim 2 wherein said shaft seal comprises a sleeve, and which includes a flange at the forward end of the sleeve and directed inwardly into the bore thereof, a packing column in said bore in engagement with the flange and means for compressing the packing column against the flange, said packing column having a circular bore for receiving and sealing against said rotatable shaft.

4. Sealing apparatus as set forth in claim 3 including means for lubricating said packing column.

References Cited in the file of this patent

UNITED STATES PATENTS

| 1,911,670 | Black | May 30, 1933 |
| 1,941,572 | Morrow | Jan. 2, 1934 |
| 2,806,748 | Krotz | Sept. 17, 1957 |

FOREIGN PATENTS

| 209,265 | Great Britain | Dec. 5, 1922 |

UNITED STATES PATENT OFFICE
CERTIFICATE OF CORRECTION

October 8, 1963

Patent No. 3,106,428

Herbert S. Lenhart

It is hereby certified that error appears in the above numbered patent requiring correction and that the said Letters Patent should read as corrected below.

Column 3, line 49, for "of," read -- of --; line 52, after "provide" insert -- a partial --; column 4, line 17, for "zones" read -- zone --; same line 17, for "pace" read -- space --; line 33, for "an" read -- and --.

Signed and sealed this 7th day of April 1964.

(SEAL)
Attest:

ERNEST W. SWIDER
Attesting Officer

EDWARD J. BRENNER
Commissioner of Patents